Patented Dec. 29, 1953

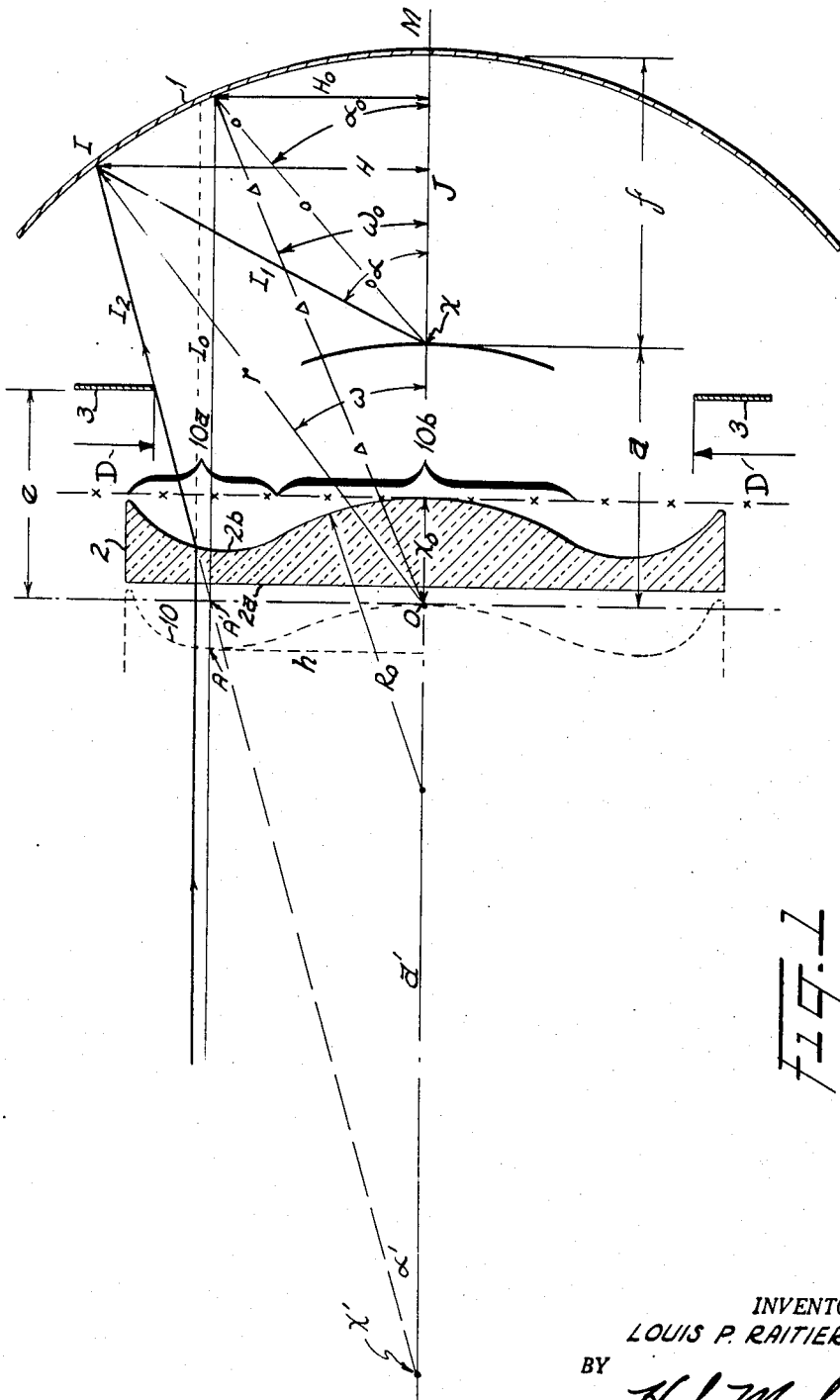

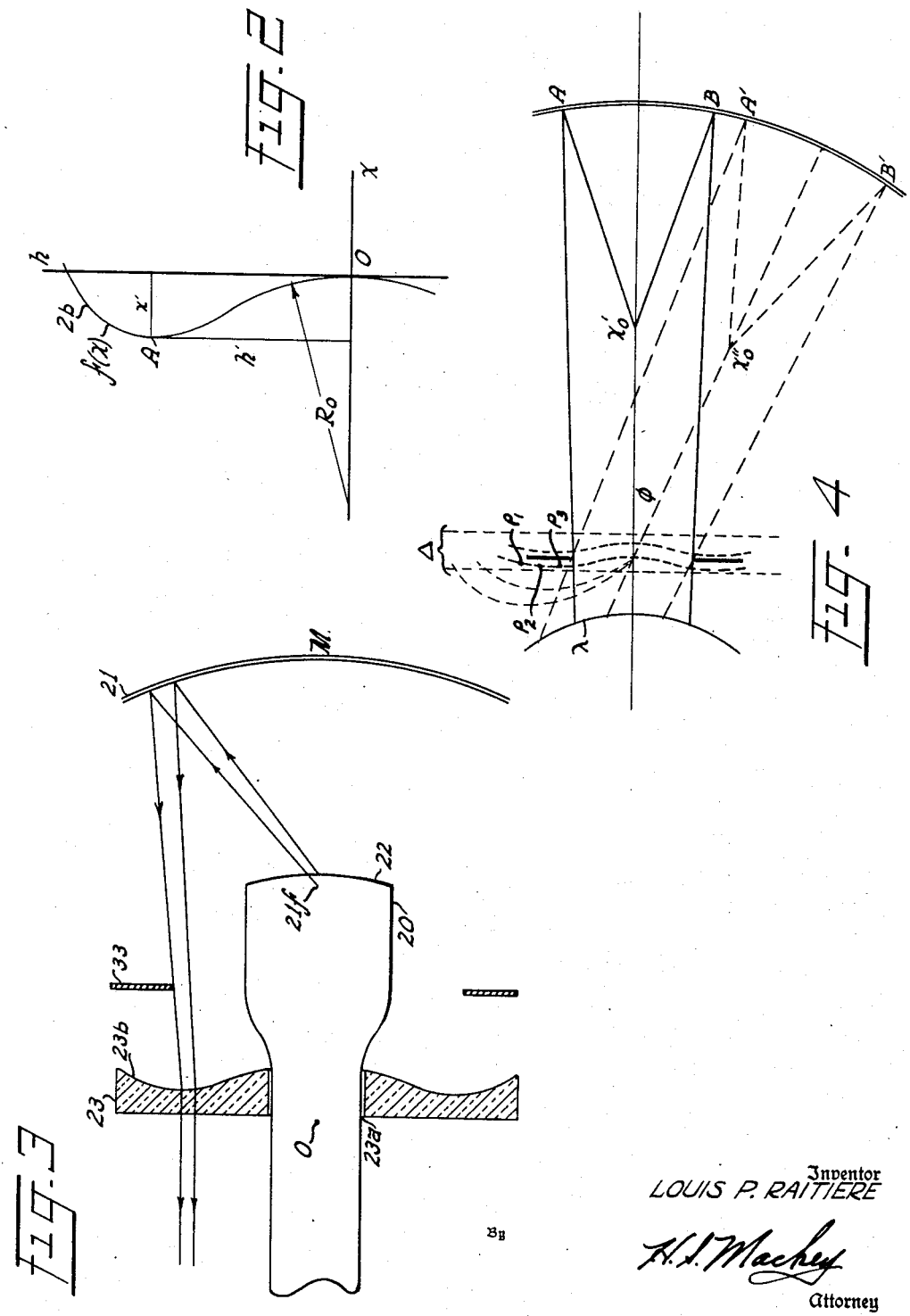

2,664,027

UNITED STATES PATENT OFFICE 2,664,027

MODIFIED SCHMIDT-TYPE OPTICAL SYSTEM

Louis P. Raitiere, Pleasantville, N. Y., assignor to General Precision Laboratory Incorporated, a corporation of New York Application February 7, 1951, Serial No. 209,808

3 Claims. (Cl. 88—57)

This invention relates to wide aperture lens systems and is particularly directed to an improved and novel optical system for use in television apparatus or the like where a wide aperture is necessary and in which the off-axis aberrations are tolerable. In projection systems it is common practice to use mirrors for the formation of images because mirrors are usually free from chromatic aberration. However, spherical mirrors have spherical aberrations and errors of coma which become very detrimental in large aperture systems. The spherical aberration in a mirror system can be reduced somewhat by the use of a mirror having an aspheric surface, such as a parabolic surface. However, as a practical matter the technique of providing the parabolic mirror surfaces becomes very difficult as the angle of field and the relative aperture of the mirror are increased. Furthermore, a parabolic mirror increases the errors of coma which reduces the practical field to a very few degrees.

As is well known, the spherical aberration can be reduced by "stopping down" a lens or mirror, that is, by inserting a diaphragm in front of the mirror so as to expose only the central portion thereof thereby eliminating the rays of light which make a large angle with respect to the axis. It is known that by correlating the position of the diaphragm with respect to the corrector plate and modifying the curvature of the mirror surface spherical aberration can be eliminated to all practical purposes. However, spherical aberration is only one of the errors that must be overcome in providing a practical optical system.

The curvature of the surfaces necessary to provide zero coma is not the same as that for zero spherical aberration and accordingly it is substantially impossible by merely changing the curvature to eliminate both spherical aberration and coma at the same time.

The well known Schmidt system constitutes a step in the direction of improvement of wide aperture optical systems in which an element for correcting the spherical aberration and astigmatism is located in the center of curvature of a spherical mirror. In this way it has heretofore been possible to attain a relative aperture of about 0.7 with an angle of field of only about 4 degrees. In these prior types of Schmidt systems a diaphragm has been located in the plane of the center of curvature of the mirror. This diaphragm so located substantially nullifies the third order aberrations but does not eliminate the spherical aberration which in these systems is reduced by the correcting element, commonly referred to as a plate.

In addition to spherical aberration and coma, other errors of off-axis aberrations are encountered in optical systems. Of the three types of errors, meridianal aberrations are by far the most objectionable, particularly in optical systems of the type to which the present invention relates. As is well-known the spherical aberration is associated only with point objects on the axis of the optical system while the other aberration errors occur in the case of point objects off the axis, that is, points from which rays proceed at an angle to the optical axis. It is well known that for point objects at relatively small angular displacement from the axis, coma is more objectionable than astigmatism while the reverse is true for large angles. The usual corrector plate which cancels spherical aberrations introduces some coma and some other off-axis aberrations, but first it is necessary to deal with coma.

It will be evident from the preceding discussion that it is not possible to eliminate all of the aberrations of an optical system or even to minimize the aberrations simultaneously. The most that can be hoped for is a compromise to produce a practical system both from the standpoint of cost and from the standpoint of optimum optical characteristics in which some of the aberrations are balanced against other aberrations. In optical systems of small apertures considerable progress has been made in effecting a compromise of these different aberrations, none of the magnitudes of which are large. However, great difficulty has been experienced in producing optical systems having wide apertures which are substantially free of spherical aberrations, coma and astigmatism. The reason for this is that it has been common practice to try to reduce spherical aberrations and astigmatism by the corrector plate and by using a diaphragm in the plane of center of curvature of the mirror to reduce third order aberrations, the location of the diaphragm greatly reducing the relative aperture.

The present invention departs from this prior line of attack as it has been found that an optical system can be provided having a relatively large field by appropriately balancing certain aberrations by a corrector plate of proper curvature and disposition relative to the mirror and by appropriately displacing the diaphragm from the center of curvature of the mirror.

Heretofore, it has been generally accepted by those skilled in the art that a diaphragm located at the center of the mirror eliminates all aberrations except spherical aberrations. The present invention is predicated on the discovery that this is not correct with the result that this invention provides a greatly improved wide-aperture optical system.

A primary object of the invention is to provide an improved optical system having a wide relative aperture with reduced aberrations.

Another object is to provide an improved optical system in which the aperture or field is increased without increasing the usual astigmatism.

A still further object is to provide an improved optical system in which the predominate aberrations are minimized in a balanced relation to provide a wide aperture within tolerable limits of aberrations.

Other and further objects will become apparent from the following description when considered in connection with the accompanying drawings in which:

Figure 1 is a schematic cross-sectional view of the fundamental components of the novel optical system.

Figure 2 is a schematic cross-sectional view showing the embodiment of Fig. 1 applied to an image projection system for television apparatus.

Figure 3 is a graph illustrating the shape of the genetrix for determining the boundary surface of the correcting plate which faces the concave mirror; and Figure 4 is a diagrammatic illustration representing some fundamental optical principles adaptable to the present invention.

The relation between the basic aberrations of an optical system, namely, spherical aberration, S; coma, B; and astigmatism A may be expressed $$A = f(S, B) \quad (1)$$

The ideal sought in optical systems is to make $$A = f(S, B,) = 0 \quad (2)$$

As has been mentioned above it is impossible to have S and B zero at the same time and therefore it is only possible to strike a balance between these factors in providing an improved optical system. As is pointed out hereinafter the present invention takes advantage of the fact that astigmatism can be cancelled in a non-aplanatic system, under three separate conditions and the basic inventive concept is based on this premise. However, in view of the fact that it is very costly to make aspherical optical surfaces in which spherical aberration is zero other relations of the elements are altered to reduce the resultant overall aberrations.

Fundamentally, the optical system of the present invention comprises a concave spherical mirror 1, a correcting refractive lens or plate 2 and a stop or diaphragm 3 interposed between the mirror and the correcting plate 2. The invention resides in the proper correlation between the curvature of the lens surface 2b, its location with respect to the surface of the mirror 1 and the relative location of the diaphragm 3 to provide an improved optical system.

As previously mentioned, the advantage of the concave mirror is that there is no chromatic aberration. The lens or corrector plate 2 is of the general type devised by Schmidt. This type of lens was originally designed primarily for use in a camera where the relative aperture was comparatively small as compared to the apertures for image projecting systems such as in television apparatus and to which the present invention is particularly adapted. In the prior Schmidt systems it has been common practice to locate both the corrector plate 2 and the diaphragm 3 in the plane of the center of curvature of the mirror. However, the present invention distinguishes from these previous Schmidt systems in that the diaphragm 3 is displaced from the corrector plate 2, between the latter and the mirror 1, for a very definite reason. It has heretofore been generally accepted by those skilled in the art that the diaphragm placed in the plane of the center of curvature of the mirror eliminated all aberrations except spherical aberrations. In the prior Schmidt systems the refractive characteristics of the corrector plate 2 have been such as to substantially neutralize all spherical aberrations, it having been throught that the placing of the diaphragm in the plane of the center of curvature of the mirror eliminated all of the other aberrations and that it was the basic factor in increasing the angle of field. However, in accordance with the present invention it has been found that this is not correct and that great improvement can be produced by displacing the diaphragm from the plane of the center of curvature of the mirror as set forth in more detail hereinafter.

The rear face of the corrector plate 2 on the side away from mirror 1 is provided with a plane surface 2a. The front boundary surface 2b on the side of the corrective plate facing the mirror, in the classical Schmidt system, would have a surface represented by the dotted outline 10 in Fig. 1. In general the boundary surface 2b has an outer annular meniscus zone 10a and a central positive zone 10b. In the conventional Schmidt system, that is, with a curvature 10 indicated by the dotted outline, substantially all of the spherical aberration of the mirror would be corrected, so that all rays parallel to the axis would be brought to focus at the focal point X of the mirror. The positioning of the diaphragm 3 in the plane of the center of curvature of the mirror necessarily would reduce the angle of field attainable in such optical systems and accordingly errors of astigmatism would not present a dominant problem in these prior systems.

As mentioned above the surface curvature of the corrective plate 2 which reduces spherical aberration of the mirror also reduces astigmatism of the latter but increases the coma. It is well known that astigmatism is greater for light rays making large angles with the axis while coma is more pronounced for light rays making smaller angles with the axis. In accordance with the present invention, the boundary surface 2b of the corrective plate 2 is modified from that of the conventional Schmidt system and the plate is moved from the plane of the center of curvature toward the mirror so that for all rays which are permitted to pass through the diaphragm 3 to the mirror 1, the maximum angle made with the axis of the optical system is within the range where astigmatism is not of such magnitude as to be objectionable.

Referring to Fig. 2 the boundary surface 2b may be represented as a mathematical function in which the curve $x = f(h)$ may be revolved about the X-axis to generate the surface. Any point on the curve $f(h)$, representing a section of the boundary surface 2b may be expressed mathematically by the general equation:

$$X = \frac{h^2}{2R_0} + Bh^4 + Ch^6 + Dh^8 + \ldots \quad (3)$$

where $R_0$, B, C and D are constants, $R_0$ being the radius of curvature of the central zone 10b of the boundary surface $2b$, $x$ is the abscissa or distance along the axis of the corrective plate corresponding to the value of the Y-ordinate represented by the letter $h'$. It will be understood that the origin of the curve of Fig. 2 corresponds to the point $X_0$ on the optical axis of the system of Fig. 1.

As has been said previously the astigmatic error is more pronounced as the angle between the light rays and the axis of the optical system increases, that is, for light rays in the outer region of the field the astigmatic error is increased and in previous systems this has restricted the upper limit of the angle of field.

For a given size aperture in the diaphragm this corresponds to an adjustment of the diaphragm toward the mirror. Accordingly, in determining the relation between the factors of the present optical system in order to increase the angle of field, the distance $e$, Fig. 1, between the center of curvature of the mirror 1 and the diaphragm 3, is taken as a basic parameter.

It is a well known fact that if an optical system is not aplanatic, i. e., if both spherical aberration and coma are not cancelled at the same time, for a given value of coma there is one position for the diaphragm where astigmatism is cancelled. However, as far as is known this factor has never heretofore been considered as having advantages significant in the conventional Schmidt system and has not been applied in such a system to increase the angle of field while at the same time minimizing the higher order aberrations.

An optical system may be non-aplanatic under the following conditions: ($a$) with spherical aberration and with coma; ($b$) with spherical aberration but without coma; and ($c$) without spherical aberration but with coma. It is therefore possible to choose either one of the three conditions mentioned above in calculating the curvature of the front surface $2b$ of the corrector plate 2 and in determining the relations between the corrector plate and the other elements of the system. As an example, condition ($c$), above, may be selected for illustrative purposes, primarily because it is very difficult and expensive to make a surface having a given amount of spherical aberration within close tolerances. All values for coma are not acceptable because for some values the abscissa of the diaphragm, i. e., the distance $e$, becomes virtual. Therefore it is necessary to choose the values for coma which give a real value for the abscissa of the diaphragm, i. e., the distance $e$, and the value chosen must be such that it will give a value for coma which is just small enough to give a tolerable circle of confusion. As has been previously mentioned the coma can be varied by changing the value of the diaphragm abscissa. The relation between spherical aberration and coma has been stated above.

Accordingly, the relations between the factors of an optical system in accordance with the present invention are determined by first computing a profile curve for the front surface $2b$ of the corrector plate 2 which will cancel the spherical aberration for different values of the abscissa $x_0$, (Fig. 1) related to the center of curvature O of the mirror 1. Then for each profile curve of the correction plate 2 the coefficient of coma is determined by conventional mathematical calculation. If the coefficient of coma for the calculated profile curve is within the tolerable limit the corresponding value of $x_0$ is used to calculate the coefficient of astigmatism in terms of the abscissa $e$ of the diaphragm 3. In other words, the two important factors are the curvature of the surface and its location relative to the center of curvature O of the mirror.

The relation between the mirror 1, the corrector plate 2 and the diaphragm 3 is clearly shown in Fig. 1, where the center of curvature of the mirror 1 is indicated by the letter O, the abscissa of the diaphragm 3 being indicated at $e$ and the center of the front surface $2b$ of the lens 2 being indicated by $x_0$, corresponding to the intersection of the X- and $h$-axes of Fig. 2. The focal length of the mirror 1 is indicated by the letter $l_1$ and is the distance between the center of the mirror 1 and its focal point X. The diameter of the aperture in the diaphragm 3 is indicated by the letter D.

The reasoning for the procedure in arriving at the relations of the factors of the present optical system stem from the fact that because it is impossible to make a perfect optical system it is needless to try to calculate curves for this theoretical perfection. With a spherical mirror, when the diaphragm is located in the plane of its center of curvature the coefficients of the third order aberrations are zero except the ones for spherical aberration and the curvature of the Petzval surface is also not zero. Also, on the other hand, in a system including a spherical refracting surface with a diaphragm located at its center of curvature the coefficients of the third order coma, astigmatism and distortion are not zero. Contrary to previous analyses, the location of the diaphragm in the plane of the center of curvature of a spherical reflecting, or refracting surface does not cancel the higher order aberrations.

Lenses and mirrors must form images of points off the axis and because of the finite size of the optical elements, the cone of rays which form the image must be of finite size and therefore departs from the infinitesimal cone of first order theory. Accordingly, there cannot be perfectly sharp images. Coma spreads all images in a plane perpendicular to the axis of the system while astigmatism and distortion spreads the image in the direction along the axis. The combined effect of these aberrations is to resolve all images into primary and secondary images which fall in respective curved surfaces tangent at the optical axis. Therefore the best focus can be only a surface of least confusion between the primary and secondary image surfaces. As has been previously mentioned certain of the aberrations can be reduced or eliminated for certain positions of the diaphragm but while one aberration is being reduced another may still exist or be increased. In accordance with the present invention, a compromise system including both a reflecting surface and a refracting surface in association with a diaphragm located between the two is provided to give a wide angle field while at the same time reducing aberrations of the prior systems.

Referring to Fig. 4, it will be seen that such a system including a combination of lens and mirror will theoretically produce perfect stigmatism, that is, there will be no spherical aberration, and accordingly the image point $X'_0$, is perfect. It also follows that the shape of the beam emerging from the correcting system is therefore independent of the half angle of field $\phi$. In other words, if the working surfaces of the mirror AB and A'B' are optically equivalent when the diaphragm is in the plane of the center of curvature of the mirror, there will also be no aberrations of the image point $X''_0$. On the other hand, if the surfaces AB and A'B' are not optically equivalent, the mirror will produce some aberrations which may be added to or subtracted from the aberrations of the correcting system as a whole regardless of the location of the diaphragm. The surfaces AB and A'B' can be made optically equivalent by a refracting surface λ of proper profile. The refracting surface λ symbolically represents the correcting plate mentioned previously.

In determining the modified Schmidt system with a large field in accordance with this invention, the plane of the center of curvature may be considered to have a finite thickness Δ and points on either side of the theoretical center are chosen for purposes of examining the inherent aberrations of the system as a whole. A number of such points $p_1$, $p_2$, $p_3$, etc., may be determined to give a profile curve having the best balance of aberrations, because as mentioned above, it is impossible to make a perfect optical system with all aberrations eliminated.

Preferably, the optical condition for perfect stigmatism is assumed in determining the profile of the front surface $2b$ of the corrector plate 2. Referring again to Figs. 1 and 2, the origin for the profile curve is chosen at O, $x=o$ when $h=o$.

The following notations are used:

$OX=a$     $OA'=h$
$XI=I_1$     Angle $IXM=\alpha$
$IJ=H$     Angle $IX'M=\alpha'$
$OX'=a'$     Angle $IOM=\omega$
$IX'=I_2$ The condition for perfect stigmatism is $$I_1+I_2+NX=\text{constant}=I_0 \quad (4)$$

where $I_0$ is the optical length of an infinite ray, with the following geometrical relations $I_1 \sin \alpha - I_2 \sin \alpha' - h = 0$
$I_1 \cos \alpha - I_2 \cos \alpha' + a - x = 0$ Obtaining the following linear system:

$I_1 \sin \alpha - I_2 \sin \alpha' - h = 0$
$I_1 \cos \alpha - I_2 \cos \alpha' + a - x = 0$
$I_1 + I_2 - I_0 + NX = 0$ and eliminating $I_1$ and $I_2$ by determinants gives $$\frac{\sin \alpha + \sin \alpha'}{\cos \alpha + \cos \alpha'} = \frac{h-(NX-I_0)\sin \alpha'}{x-a-(NX-I_0)\cos \alpha'} \quad (5)$$

From Fig. 1 it is seen that $$\alpha - \omega = \omega - \alpha' \quad (6)$$

so that $\sin \alpha \cos \omega - \cos \alpha \sin \omega$
$\qquad = \sin \omega \cos \alpha' - \sin \alpha' \cos \omega \quad (7)$ or $$\tan \omega = \frac{\sin \alpha + \sin \alpha'}{\cos \alpha + \cos \alpha'} \quad (8)$$

Substituting the equivalent of the right hand term of Equation 8 from Equation 5 gives $$\tan \omega = \frac{h-(NX-I_0)\sin \alpha'}{x-a-(NX-I_0)\cos \alpha'} \quad (9)$$

$$\tan \alpha' = \frac{h}{x-a'} = \frac{H}{OJ}-a' \quad (10)$$

With an assumed focal length of unity for the mirror, $r=2$, since the radius of curvature $r$ of a spherical mirror is equal to two times the focal length. Accordingly, $$H=r \sin \omega = 2 \sin \omega \quad (10a)$$

and $$OJ=r \cos \omega = 2 \cos \omega \quad (10b)$$

Using the above relations, applied to the similar right triangles gives $$\frac{h}{a'-x} = \frac{2 \sin \omega}{a'-2\cos \omega} \quad (11)$$

With Equations 9 and 11 the following linear system is obtained:

$[N \sin \alpha' + (1-N \cos \alpha') \tan \omega] x - h = I_0$
$\sin \alpha' + (a-I_0 \cos \alpha') \tan \omega \, 2 \sin \omega \, x$
$\qquad + (a'-2\cos \omega) h = 2 a' \sin \omega \quad (12)$ which gives $$I_0 = 4 - a + (N-1) X_0 \quad (13)$$

Substituting and solving for $x$ gives $$x = \frac{2a' \sin \omega + [I_0 \sin \alpha' + (a-I_0 \cos \alpha') \tan \omega](a'-2\cos \omega)}{2 \sin \omega + [N \sin \alpha'(1-N \cos \alpha') \tan \omega](a'-2\cos \omega)} \quad (14)$$

Solving for $h$ gives $$h = \frac{2 \sin \omega (Na'-I_0) \sin \alpha' + [a'-a-(Na'-I_0)\cos \alpha'] \tan \omega}{2 \sin \omega + [N \sin \alpha' + (1-N \cos \alpha') \tan \omega](a'-2\cos \omega)} \quad (15)$$

It is possible to demonstrate the following relations:

$$\frac{1}{a'}+\frac{1}{a}=\cos \omega \quad (16)$$

$$\sin^2 \alpha' = \frac{4 \sin^2 \omega}{4 \sin^2 \omega + (2 \cos \omega - a')^2} \quad (17)$$

$$\cos^2 \alpha' = \frac{(2 \cos \omega - a')^2}{4 \sin^2 \omega + (2 \cos \omega - a')^2} \quad (18)$$

which with Equations 14 and 15 give the following parametric equations, $$x = \phi(\omega) \quad (19)$$
$$h = (\omega) \quad (20)$$

from which the meridian curve of the aspheric surface $2b$ is determined for the condition of perfect stigmatism.

In Equations 19 and 20 there are two undetermined coefficients, $I_0$ and $a$. If the correcting plate is located in the plane of the center of curvature of the mirror 1, that is, if $x_0=o$, Equation 13 becomes $$I_0 = 4 - a \quad (21)$$

The shape of the meridianal curve of the surface $2b$ is determined mainly by the coefficient $a$. In Equation 16 when $a'=\infty$ $$\frac{1}{a}=\cos \omega \quad (22)$$

Since the radius $r$ of the mirror equals 2

$$H_0 = 2 \sin \omega_0 \quad (23)$$

where $H_0$ is the ordinate of the neutral zone of the aspherical surface $2b$. Using the trigonometric identity $$\sin^2 \omega = 1 - \cos^2 \omega \quad (24)$$

Then substituting from Equation 22

$$\sin \omega_0 = \sqrt{1-\frac{1}{a^2}} \quad (25)$$

Therefore $$H_0 = 2\sqrt{\frac{a^2-1}{a^2}} \qquad (26)$$

In a very large aperture system, it is not practical to consider the order of the development of aberrations because they become so merged that it is simpler to consider all the off-axis aberrations other than coma, as astigmatism. The angle of field is limited by coma. The condition of no coma exists only when the law of Abbe obtains, that is, when $$\frac{h}{\sin \alpha} = \text{constant} \qquad (27)$$

But for a spherical mirror and for an infinite point $$\frac{h}{\sin \alpha} = \frac{r}{2 \cos \frac{\alpha}{2}} \qquad (28)$$

and $$\frac{h}{\sin \alpha}$$

is not constant. Therefore, the field must be limited to an angle within which the coma is tolerable. In prior Schmidt systems with the center of the corrector plate in the plane of the center of curvature of the mirror, the diaphragm in the same plane is ineffective as far as coma is concerned.

In accordance with the present invention, a number of profile curves, indicated by the dotted curves in Fig. 4, are calculated using the above equations which give values of both axial and off-axis longitudinal aberration, that is, astigmatism, which are within tolerable limits. As well understood in the optical art, in calculating the profile curves, consideration should be given to the selection of a profile which requires a minimum of grinding and therefore results in a minimum cost. By interpolation, an empirical relation between the axis longitudinal aberrations and the off-axis aberrations is established. The largest aberration determines the selection of the profile curve. Similarly, several positions for the diaphragm 3, that is, the value of the abscissa e are examined in order to obtain a tolerable value of coma as previously mentioned.

Merely by way of illustration, and not by way of limitation, a practical example of the optical system in accordance with the present invention has the following relative values. With a concave spherical mirror having a relative radius of curvature of 2 and a focal length of 1, the diameter D of the stop, or diaphragm 3, had a value of 1.28. The diameter of the mirror was 2.04 and the diaphragm 3 was interposed between the corrector plate 2 and the mirror 1 giving the ratio $$\frac{e}{f} = +0.84$$

The value of $x_0$ in this example was 0.32 and the diameter of the correcting plate 2 was 1.50. This arrangement gave a relative aperture of 0.808 with an angle of field of 24°.

An illustrative example of the application of the present optical system to an image projection system for television apparatus is shown in Fig. 3 where a conventional television cathode ray tube 20 is positioned in front of a concave spherical mirror 21, the face or screen 22 of the cathode ray tube being so positioned that the edges of the screen are in the plane of the focal point 21f of the mirror 21. It is to be assumed, of course, that image signals received from a television transmitter are amplified and supplied through an appropriate apparatus to modulate an electron beam to produce an image on the fluorescent cathode ray tube screen 22 from which the image may be projected to observers in front of the concave spherical mirror 21.

It will be readily apparent that in this adaptation of the invention the center portion of a corrector plate 23 is eliminated to accommodate the neck of the cathode ray tube 20. Obviously, the center portion of the corrector plate 23 is not needed because of the location of the cathode ray tube screen 22 substantially in the focal plane of the mirror 21. Because of the conjugate focal relations of a lens system, analysis can be made by considering rays passing in a direction from the focal plane toward the mirror 21. It is to be understood that the corrector plate 23 is identical with the corrector plate 2 described in connection with Fig. 1 except that it has a center opening 23a to accommodate the neck of the cathode ray tube 20. It is also to be understood that the relation between the mirror 21, the corrector plate 23 and the intermediate diaphragm 33 is identical with the relation between the mirror 1, the corrector plate 2 and the diaphragm 3 of Fig. 1.

It will be seen that because the screen 22 of the cathode ray tube 20 is located substantially in the focal plane of the mirror 20 there is no need for the central zone in the corrector plate 23 which would correspond substantially to the positive zone 1ub of the corrector plate 2 shown in Fig. 1. Since the relative aperture of an optical system is dependent upon the area of the aperture, the effective image-forming area of the illustration of Fig. 3 is necessarily reduced and in accordance with the mathematical relation between the focal length and the area of the aperture of the mirror the effective relative aperture or f-number of the system is necessarily increased. However, because of the modification of the boundary surface 23b of the corrector plate 23 and the relation between the latter, the mirror 21, and the diaphragm 33, an improved image projection system is provided in accordance with the principles set forth above.

From the foregoing description, it will be readily apparent that the present invention provides an improved optical system making it possible to provide optical systems with a comparatively wide angle of field while at the same time keeping the aberrations within tolerable limits which is now possible only with lenses of much smaller aperture. The invention has been described by reference to a specific illustration but it will be clearly understood by those skilled in the art that certain changes can be made without departing from the spirit of the invention.

What is claimed is:

1. A catadioptric optical system adjusted for finite conjugate foci, said system comprising a concave spherical mirror, a correcting element positioned on the axis of said system for cancelling the spherical aberration of said mirror, a diaphragm having an aperture symmetrically disposed about the axis of said system, said diaphragm and said corrector element being positioned between said mirror and the center of curvature of the latter, said diaphragm being spaced from the center of curvature within the limits of $0.80R < e < 0.86R$, said corrector element being spaced from said center of curvature a distance X within the limits of $0.81R < x_0 < 0.022R$, where R is the radius of curvature of said mirror, $e$ is the distance of the diaphragm from the center of curvature, $x_0$ is the distance of the corrector element from the center of curvature of the mirror and where the diameter D of the aperture in said diaphragm is within the limits $0.50R < D < 0.80R$.

2. An optical system as set forth in claim 1, in which D is substantially 0.50R.

3. An optical system as set forth in claim 2, in which D is substantially 0.80R.

LOUIS PIERE RAITIERE.

References Cited in the file of this patent

UNITED STATES PATENTS

| Number | Name | Date |
|---|---|---|
| 2,141,884 | Sonnefeld | Dec. 27, 1937 |
| 2,170,979 | Staubel | Aug. 29, 1939 |
| 2,273,801 | Landis | Feb. 17, 1942 |
| 2,295,779 | Epstein | Sept. 15, 1942 |
| 2,309,788 | Ramberg | Feb. 2, 1943 |
| 2,350,112 | Houghton | May 30, 1944 |
| 2,449,345 | Van Alphen | Sept. 14, 1948 |
| 2,454,144 | Epstein | Nov. 16, 1948 |
| 2,470,198 | Traub | May 17, 1949 |
| 2,492,461 | Bouwers | Dec. 27, 1949 |